Jan. 18, 1927.
C. W. FINGER
1,614,784
SEGMENTAL CRUSHING ROLL
Filed April 19, 1926
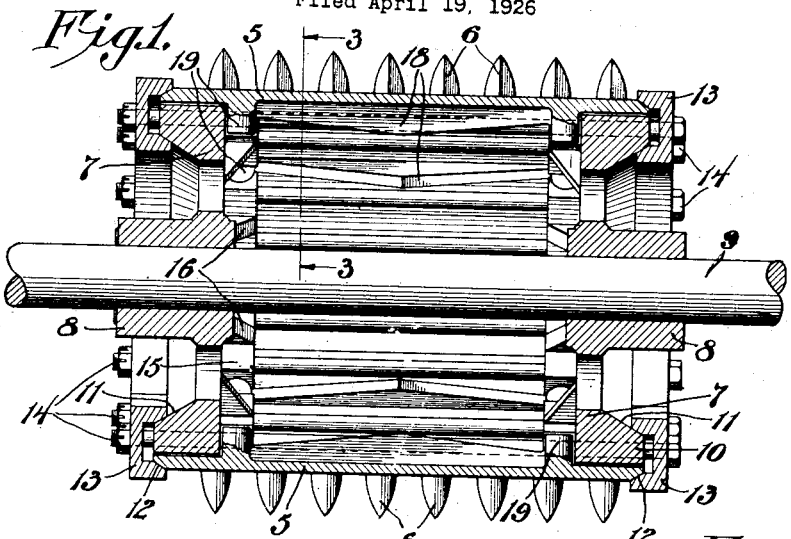
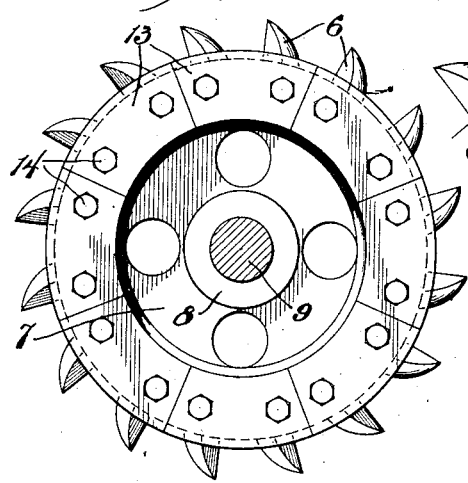
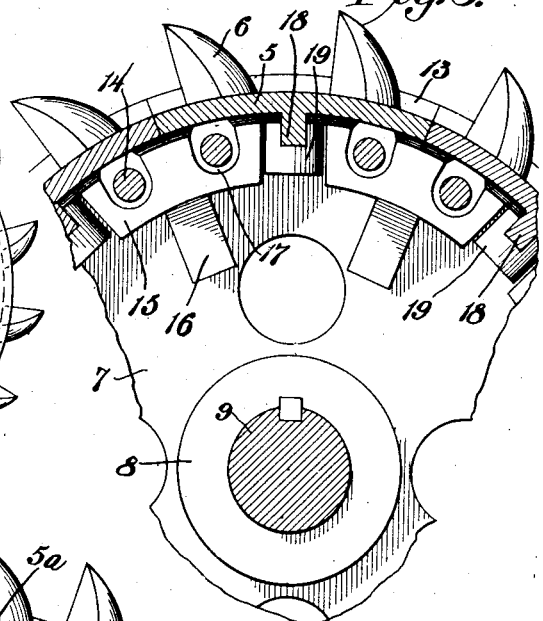
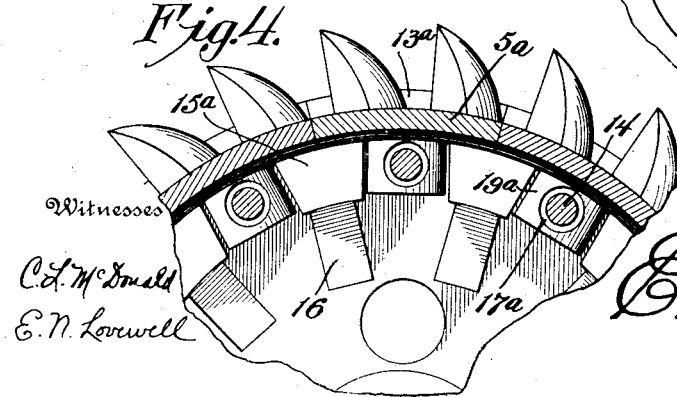
Witnesses
C. L. McDonald
E. N. Lovewell
Inventor
Carl W. Finger
Attorney Patented Jan. 18, 1927.

1,614,784

UNITED STATES PATENT OFFICE.

CARL W. FINGER, OF WILKES-BARRE, PENNSYLVANIA.

SEGMENTAL CRUSHING ROLL.

Application filed April 19, 1926. Serial No. 103,052.

This invention relates to an improvement in crushing rolls adapted for use in machines for crushing or breaking coal, rock, ore and the like, and especially to means for detachably securing segments thereto, which constitute the crushing elements.

Heretofore in rolls provided with detachable segments for crushing elements, the latter have usually been secured by ordinary bolts passing directly therethrough. Such bolts come in direct contact with the material crushed, and if the material is of an abrasive nature, the bolts are soon worn out and the segments become loose. The segments are usually made of manganese steel, which can not be machined or drilled. The holes are cored, which can not be done accurately, and the replacement of segments is made very difficult due to differences in bolt holes.

The object of the present invention is to provide an improved construction for a roll of this type, and especially to provide improved means for securing the segmental crushing elements, so that the bolt holes therein may be dispensed with, and said elements held in fixed relative position on the roll by securing the same at the ends.

In the specific embodiment of the invention herein described, the faces of the segmental elements are beveled at the ends, and end members, having beveled inside faces engaging the same, are held together by means of tie rods or bolts extending longitudinally through the roll. To prevent the segmental elements from moving circumferentially of the roll, a projection is cast on the inner face of each segment near the end thereof, which is received between corresponding lugs cast on the inner faces of the disks or spiders forming the ends of the roll.

The specific construction of the invention and the advantages thereof will be more clearly explained in connection with the accompanying drawing, which illustrates the same in its preferred form.

In the drawing:

Figure 1 is a central longitudinal section through the roll.

Figure 2 is an end elevation thereof, the shaft being shown in section.

Figure 3 is a fragmentary section, on an enlarged scale, taken substantially on the line 3—3 of Figure 1.

Figure 4 is a view similar to Figure 3, but shows a slightly modified form of the invention.

In accordance with the invention, the lateral or convex surface of the roll is made up of a plurality of segmental crushing elements 5, having outwardly projecting teeth 6. The ends of the roll are formed by disks or spiders 7, each having a hub 8 keyed to a shaft 9.

Each end disk or spider 7 is formed with an outwardly projecting rim 10, having an internal beveled face 11. The adjacent ends of the segmental elements 5 are also formed with a beveled surface 12, which extends continuously around the end of the roll when the device is assembled. The segmental elements are secured at each end by a ring 13, made up of segments corresponding in length to the widths of the respective elements 5. The ring is channel shaped in cross section, and the opposed edges of the channel are beveled to fit the beveled surfaces 11 and 12. The device is held in assembled relation by tie rods or bolts 14, which extend longitudinally through the interior of the roll.

The inner face of each disk or spider 7 is formed near its periphery with arcuate spaced lugs 15, with reinforcing webs 16 extending radially therefrom. In the form shown in Figure 3, each lug 15 is formed with recesses 17 to leave spaces for the bolts 14 to pass through. Each segmental element 5 is formed on its inner face with a longitudinal reinforcing web 18, at each end of which is a lug 19 adapted to be received between two consecutive lugs 15 formed on the end of the adjacent end disk, thereby preventing any appreciable creeping of the segmental elements circumferentially of the roll.

In the form shown in Figure 4, the segmental elements $5^a$ are somewhat narrower than the segmental elements 5, the segments of the ring $13^a$ are correspondingly shorter, and the inwardly extending lug $19^a$, formed at each end of each element $5^a$ is provided with a hole $17^a$ for receiving one of the tie rods 14. The lugs $15^a$ are correspondingly smaller than the lugs 15. In other respects, the form shown in Figure 4 is the same as that shown in Figures 1 to 3, inclusive.

The segmental elements 5 or $5^a$, according to the present invention are made by casting, and are composed of manganese steel, or other alloy, which is unusually hard and cannot be easily machined. The holes are made by coring, and although the dimensions of the segmental elements are not determined with a great degree of precision, they will be securely held together by the segmental rings 13 to form substantially a perfect cylinder, which will be concentric to the shaft 9. One or more lugs 19 or 19ª, by engaging the corresponding lugs 15 or 15ª, will absolutely prevent any creeping of the segmental elements circumferentially of the roll.

From the foregoing description, it will be seen that as a result of this invention, the construction of the segmental elements is greatly simplified, and they may be made with correspondingly less expense than heretofore. The end of each segmental element is individually clamped to the rim by a segment of the ring 13 or 13ª, so that the danger of the segmental elements becoming loose is practically eliminated, and no machining is necessary. At the same time, when these elements are worn out, they may be easily and quickly replaced.

While I have shown and described in detail the specific construction of the invention in its preferred form, it is to be understood that this is merely for the purpose of illustration, and that various other modifications may be made in the form and arrangement of the various features without any material departure from the salient features of the invention as set forth in the claims.

What is claimed is:

1. A crushing roll comprising a series of detachable segmental elements collectively forming the cylindrical surface of the roll and having inwardly projecting lugs, circular members forming the ends of the roll and having on their inner faces integral arcuate lugs disposed between the first-mentioned lugs, integral reinforcing webs underneath said arcuate lugs, said circular members and arcuate members having oppositely disposed concentric beveled surfaces, end rings which are channel shaped in cross section and divided radially into sections corresponding to the respective segmental elements, the edges of the channels having beveled portions engageable with said beveled surfaces, and tie rods extending longitudinally through the roll to hold the rings in clamping engagement with the beveled surfaces.

2. A crushing roll comprising a series of detachable segmental elements collectively forming the cylindrical surface of the roll and having inwardly projecting lugs, circular members forming the ends of the roll and having lugs interposed between said first-mentioned lugs to prevent circumferential movement of the segmental elements with respect to said circular members, said segmental elements and circular members having oppositely disposed concentric beveled surfaces, end rings divided radially into sections corresponding to the respective segmental elements and having beveled edges engageable with said beveled surfaces, and tie members extending longitudinally through the roll to hold the sections of the rings in clamping engagement with said surfaces to prevent endwise movement of the segmental elements.

3. A crushing roll comprising a series of detachable segmental elements collectively forming the cylindrical surface of the roll, circular end members having comparatively wide rims supporting the end portions of the segmental elements, said elements and rims having oppositely disposed beveled surfaces, end rings divided radially into sections corresponding to the respective segmental elements and having beveled edges engageable with said beveled surfaces, means on the segmental elements to hold the end members in spaced relation to each other, and tie members extending longitudinally through the roll and adjustable to draw the sections of said end rings toward each other into clamping relation to said end members.

4. A crushing roll comprising a series of detachable segmental elements collectively forming the cylindrical surface of the roll, circular end members having comparatively wide rims supporting the end portions of the segmental elements, said elements and rims having oppositely disposed beveled surfaces, end rings divided radially into sections corresponding to the respective segmental elements and having beveled edges engageable with said beveled surfaces, spaced arcuate lugs formed on the inner surfaces of the end members with radial reinforcing webs therebeneath, lugs on the segmental elements extending radially between said arcuate lugs to prevent circumferential movement of said elements with respect to the end members, and tie members extending longitudinally through the roll and adjustable to draw the sections of said end rings toward each other into clamping relation to said end members.

5. A crushing roll comprising a series of detachable segmental elements cast from comparatively hard metal and collectively forming the cylindrical surface of the roll, circular end members having rims supporting the end portions of the segmental elements, said elements and rims having oppositely disposed beveled surfaces, end rings divided radially into sections corresponding to the respective segmental elements and having beveled edges engageable with said beveled surfaces, spaced arcuate lugs formed on the inner faces of the end members, lugs on the segmental elements extending radially between said arcuate lugs to prevent circumferential movement of said elements with respect to the end members, and tie members extending longitudinally through the roll and adjustable to draw the sections of said end rings toward each other into clamping relation to said end members, certain of said lugs being formed with holes for the tie members to pass through, said holes being larger in diameter than the tie members to allow for irregularities in casting.

6. A crushing roll comprising a series of detachable segmental elements cast from a comparatively hard alloy and collectively forming the cylindrical surface of the roll, circular end members having rims supporting the end portions of the segmental elements, said elements and rims having oppositely disposed beveled surfaces, end rings divided radially into sections corresponding to the respective segmental elements and having beveled edges engageable with said beveled surfaces, spaced arcuate lugs formed on the inner faces of the end members with radial reinforcing webs therebeneath, each of said segmental elements having a reinforcing rib extending longitudinally of its inner face with lugs at the ends thereof interposed between respective arcuate lugs to prevent circumferential movement of said elements with respect to the end members and to form abutments against which said end members are seated, and tie members extending longitudinally through the roll and adjustable to draw the sections of said end rings toward each other into clamping relation to said end members, said arcuate lugs being formed with holes for the tie members to pass through, said holes being larger in diameter than the tie members to allow for irregularities in casting.

In testimony that I claim the foregoing as my own, I have hereto affixed my signature.

CARL W. FINGER.